United States Patent [19]

Drewery

[11] Patent Number: 5,667,670

[45] Date of Patent: Sep. 16, 1997

[54] WASTEWATER EFFLUENT MANAGEMENT SYSTEM USING A SAND FILTER

[76] Inventor: T. Gig Drewery, P.O. Box 186, Kountze, Tex. 77625-0186

[21] Appl. No.: 635,499

[22] Filed: Apr. 22, 1996

Related U.S. Application Data

[62] Division of Ser. No. 133,645, Oct. 8, 1993, Pat. No. 5,536,404.

[51] Int. Cl.⁶ .................................................... C02F 9/00
[52] U.S. Cl. ................... 210/86; 210/88; 210/90; 210/98; 210/104; 210/108; 210/143; 210/202
[58] Field of Search .......................... 210/86, 88, 90, 210/93, 104, 105, 116, 123, 124, 127, 167, 196, 202, 263, 266, 275, 277, 289, 291, 98, 108, 143

[56] References Cited

U.S. PATENT DOCUMENTS

| | | | |
|---|---|---|---|
| 3,123,555 | 3/1964 | Moore | 210/124 |
| 5,068,033 | 11/1991 | Tobias et al. | 210/169 |
| 5,374,352 | 12/1994 | Pattee | 210/124 |

*Primary Examiner*—Ivars Cintins
*Attorney, Agent, or Firm*—Harrison & Egbert

[57] ABSTRACT

A system for controlling effluent discharge having an inlet for passing wastewater, a filter connected to the inlet for removing solids from the wastewater, a filtered water retaining tank connected to the outlet of the filter for accumulating a portion of the water passed from the filter, a filtered water outlet connected to the outlet of the filter so as to pass filtered water exterior of the system, and a controller connected to the filtered water retaining tank so as to selectively pass a flow of the accumulated water into the filter. The filter includes a first body portion connected to the inlet, a second body portion connected to the first body portion, a filter screen disposed in the second body portion between the first body portion and the outlet and having a plurality of openings therein, and a particulate filter material filling an area between the second body portion and the filter screen. The particulate filter material extends into the first body portion so as to filter wastewater passing therethrough.

17 Claims, 7 Drawing Sheets

WASTEWATER EFFLUENT MANAGEMENT SYSTEM USING A SAND FILTER

This is a divisional of application Ser. No. 08/133,645 filed on Oct. 8, 1993, now U.S. Pat. No. 5,536,404.

TECHNICAL FIELD

The present invention relates to apparatus and methods for the filtering and control of wastewater effluent. More particularly, the present invention relates to management systems for controlling the flow of wastewater effluent. Specifically, the present invention relates to wastewater filters and, more specifically, to sand-type filters.

BACKGROUND ART

In recent years, there has been a great deal of effort devoted to the management of household, commercial, and marine wastewater effluent. In many situations, in the past, households have used septic tanks with conventional drainfields for the treatment and disposal of wastewater. Similarly, in relatively remote areas, it is common for businesses to utilize such septic tanks for the disposal of wastewater. After the wastewater has been accumulated in a septic tank, it is commonly removed by tank trucks passing periodically through the area.

Fortunately, the era of the septic tank drainfield system being used indiscriminantly is slowly disappearing. Presently, there are several household and commercial wastewater treatment systems that are presently on the market. These systems are designed to serve homes and small commercial establishments outside the reach of a city sewer. These systems utilize a similar treatment process as used by most large central treatment plants. One such system is identified as a HYDRO-FLO (TM) wastewater treatment system. This HYDRO-FLO (TM) system is a self-contained, automatic system. This system essentially aerates the raw wastewater and mixes the wastewater with activated sludge. Aerobic bacteria use the oxygen, from the aeration process, to break down the wastewater so as to convert it into odorless liquids and gases. This HYDRO-FLO (TM) system is presently sold by Hydro-Flo wastewater Treatment Systems, Inc. of Kountze, Tex.

In many circumstances, the discharge from such household wastewater treatment systems is suitable for disposal into underground drainfields or for surface disposal. Unfortunately, in a wide variety of other situations, the discharge of such household wastewater treatment systems is considered unsatisfactory for irrigation purposes and, in particular, for drip irrigation systems. Ideally, it is desirable to reuse the household wastewater on the lawn or landscape. Drip irrigation has been found to be a particularly effective manner in which to irrigate.

The main reason why the household wastewater treatment systems are inadequate for irrigation purposes is the fact that periodically the effluent contains relatively large biological particles therein. Efforts have been made, in the past, so as to filter the effluent discharge from these household wastewater treatment systems. Under limited circumstances, conventional screen and/or disk filter arrangements can effectively remove the large particles from the effluent discharge. The large particles must be removed so as to prevent clogging of the drip irrigation lines and to prevent clogging of the orifices of spray irrigation systems.

It has been found that these conventional filter arrangements have proven inadequate in continuous usage. In virtually all circumstances, these screen and disk filters will be quickly and easily clogged with the biological effluent discharge material. As soon as these filters are clogged, the entire wastewater treatment system, and discharge system, are rendered inoperable. Under certain circumstances, backflushing techniques have been employed in an effort to avoid the clogging of the filters. Unfortunately, disk and screen type filters have not responded well to backflushing. If the household wastewater treatment system is used for home irrigation purposes, then the effluent in a large number of cases must be filtered. Under conventional applications, these filters have required replacement, repair, and continual attention so as to enable the system to function properly. None of the prior applications, in the past, have found practicality as a continuous system for the irrigating of land.

In many remote locations, it is very difficult to obtain enough water for the continual operation of toilets and/or commodes. Under certain circumstances, treated effluent can be recycled for use in the storage tank of a toilet. Since the water stored in the storage tank of a toilet is not consumed, then the treated effluent is particularly suitable for use in the storage tank. Unfortunately, with regard to small wastewater flows, efforts in the past have not been directed so as to utilize the treated effluent in the storage tank of a toilet.

In many areas it will be desirable to use the wastewater effluent management system to protect the environment when using direct discharge or the drainfield as the effluent disposal method.

In the past, a large variety of water filters have been patented. For example, U.S. Pat. No. 616,031, issued on Dec. 13, 1898 describes a siphon carbon faucet filter. This filter is interconnected to a faucet for the purpose of removing particles from the water of the faucet. An activated charcoal material is maintained within a compartment in fluid communication with the outlet of the faucet. As the water passes through the carbon filter, the particles and impurities are effectively removed from the water.

U.S. Pat. No. 1,979,197, issued on Oct. 30, 1934 to A. Harf discloses a filter which includes a tank filled with a charcoal material. The tank has an inlet, for receiving water, and an outlet for passing filtered water therefrom. The tank is divided into compartments for the accumulation of the water.

U.S. Pat. No. 1,326,374, issued on Dec. 30, 1919 teaches a water filter that has a layered arrangement of sand, gravel, charcoal and furnace slag. Water is delivered to this layered arrangement of filter materials from an inlet. The filtered water will then pass outwardly of a tank from an outlet at the bottom of the tank.

U.S. Pat. No. 2,742,156, issued on Apr. 17, 1956, to E. G. Spangler teaches a liquid purifying separator having a hollow fluid passing shell, a filter chamber contained within and spaced from a side wall of the shell, and a means for passing fluid downwardly through the chamber to pass out a lower portion of the chamber. A mass of filter material is located within the inner chamber for separating entrainment from the fluid to fall downwardly from the chamber toward a bottom shell outlet. In particular, this mass of filter material includes wood shavings.

U.S. Pat. No. 2,997,178, issued on Aug. 22, 1961, to W. Lorimer provides a water filter that has a supporting head disposed to be tapped into the pipe carrying the water to be filtered. A primary screen filter removes any relatively coarse particles from the water. A means is provided for supporting a bed of loose filtering material. A distribution system is provided so as to cause the water to be passed over the bed and to cause it to pass in forward and return directions through the filtering body before being released for consumption.

U.S. Pat. No. 3,126,335, issued on Mar. 24, 1964, to W. E. Stipe provides a water softener which is a tubular member having an inlet at one end and an outlet at an opposite end. The pipe is provided with a bed of gravel and the remainder is filled with a filler of granular zeolite or resin beads, charged with sodium ions. As raw water flows downwardly through the filter in the pipe, there occurs an ion exchange between the calcium in the water and the sodium-charged filler.

U.S. Pat. No. 3,710,944, issued on Jan. 16, 1973, to H. E. Budeshein describes a water filter for filtering water contained suspended mechanical impurities and also chemical impurities. This filter first passes the water through a mechanical filter, which traps the mechanical impurities, and then passes the water through a chemical filter, which removes the chemical impurities. The device includes a generally cylindrical housing in which is mounted a sleeve of a rigid water pervious filter medium. One end of the housing opens into one end of the filter. A container containing a chemical agent capable of removing the chemical impurities is in communication with the interior of the housing.

U.S. Pat. No. 5,116,502, issued on May 26, 1992, to G. E. Ferguson describes a horizontal countertop water filter. This water filter has a horizontal housing defining a fluid inlet channel and a fluid filtration chamber. The water filter is fitted with a diverter valve and a fluid conduit which conducts diverted fluid from the sink faucet into the water filter.

Soviet Patent No. 1584-984-A teaches a water filtering unit which has a floating charge made of granules of lower density than water. A water supply pipe is placed tangentially to the body outer surface. The water is supplied under pressure to the body which is prefilled with water. The water passes through a pipe and is swirled in the body's cylindrical part. Due to the centrifugal force, the suspension is separated and is concentrated in the sediment in the body's conical part.

It is an object of the present invention to provide an effluent management system that effectively filters effluent for use as irrigation water.

It is another object of the present invention to provide an effluent management system that allows household and commercial wastewater to be used in drip irrigation systems.

It is another object of the present invention to provide an effluent management system that allows filtered disinfected water to be used in conjunction with a household commode.

It is another object of the present invention to provide an effluent management system that effectively filters and disinfects wastewater effluent to protect the environment when using direct discharge or conventional drainfield to dispose of the effluent.

It is another object of the present invention to provide an effluent management system that effectively circulates effluent.

It is still a further object of the present invention to provide a filter that can be effectively backflushed during continual operations.

It is another object of the present invention to provide a filter that effectively removes particles of greater than one hundred microns.

It is still a further object of the present invention to provide an effluent management system that can be connected to a pretreatment facility.

It is another object of the present invention to provide an effluent management system that is easy to use, easy to maintain, relatively inexpensive, and easily monitored.

These and other objects and advantages of the present invention will become apparent from a reading of the attached specification and appended claims.

SUMMARY OF THE INVENTION

The present invention is a wastewater filter that comprises a fluid inlet, a fluid outlet, a first body portion connected to the fluid inlet, a second body portion connected to the first body portion, a filter screen disposed in the second body portion between the first body portion and the fluid outlet, and a particulate filter material filling an area between the second body portion and the filter screen and extending into the first body portion. The filter screen has a plurality of openings formed therein. The particulate filter material serves to filter wastewater passing through the filter.

The first body portion is in communication with and extends transversely through the second body portion. The first body portion extends vertically above the second body portion. The second body portion extends horizontally. The fluid inlet is positioned at an end of the first body portion. The fluid outlet is positioned at an end of the second body portion. The particulate filter material extends for less than a height of the first body portion. The particulate filter material extends continuously from the second body portion to the first body portion.

The filter screen is a tubular member which extends from the fluid outlet into the second body portion. The openings in the filter screen are slits formed in the tubular member. The slits are formed on the tubular member transverse to a longitudinal axis of the tubular member. Each of the slits has a width less than a diameter of a particle of the particulate filter material. The tubular member has a length less than a length of the second body portion. The particulate filter material fills a volume of the second body portion exterior of the tubular member. The particulate filter material is ideally sand (otherwise known as silica particles).

The present invention is also a system for controlling effluent discharge that comprises an inlet for passing wastewater, a filter connected to the inlet so as to remove solids from the wastewater, a filtered water retaining chamber connected to an outlet of the filter for accumulating a portion of the water passed from the filter, a filtered water outlet connected to an outlet of the filter so as to pass filtered water exterior of the system, and a controller connected to the filtered water retaining chamber so as to selectively pass a flow of the accumulated water into the filter. This system also includes a pump for passing wastewater into the inlet. The controller is interconnected to the pump. The pump has an active state and an inactive state. The controller passes the flow during the inactive state of the pump. The pump specifically includes a wastewater tank, a float switch positioned within the wastewater tank, and a water pump positioned within the wastewater tank. The float switch is connected to the pump so as to control the pump between the active state and the inactive state. The float switch is responsive to a level of wastewater in the tank.

The filter of this system is a sand filter of a type described herein previously.

The filtered water retaining chamber includes a captive air tank in valved communication with the filter and the filtered water outlet. This captive air tank has an interior bladder therein. The controller is connected to the captive air tank so as to cause the accumulated water to backflush the filter.

The filtered water outlet includes a sand trap which is interconnected to the outlet of the filter so as to remove sand particles from the filtered water. The filtered water outlet also includes a conduit extending from an outlet of the filter and a pressure regulator demountably attached along the conduit. The pressure regulator serves to control a pressure of the filtered water passing therethrough. The filtered water outlet also includes a conduit extending from an outlet of the filter and a fluid injector demountably attached along the conduit. The fluid injector serves to inject a chemical into the filtered water as passed through the filtered water outlet. The filtered water outlet can also include a flow meter which is demountably attached along the conduit.

The filtered water outlet includes a plurality of drip tubing lines extending outwardly of the system for passing filtered water. The plurality of drip tubing lines have an end connected to a flush line. This flush line extends to a treatment tank of the system.

In an alternative embodiment of the present invention, the filtered water outlet also includes a means for connection to a household commode. This system includes a conduit which extends from an outlet of the filter, an accumulation tank connected in valve communication with the conduit so as to receive filtered water from the conduit, and a commode connector extending from the accumulation tank to a commode tank. The controller serves to actuate a valve so as to pass filtered water from the accumulation tank into the commode tank. The accumulation tank is a captive air tank. A pressure switch is connected to the conduit end of the controller so as to open the valve upon sensing a pressure in the conduit below a predetermined value and for closing the valve upon sensing pressure in the conduit above a predetermined value.

In another alternative embodiment of the present invention, there is provided a filter backwash monitoring system. A pressure switch is mounted on the inlet side of the filter. Power is supplied to the pressure switch. The pressure switch is connected to the delay relay, to the float switch, to the pump, and to the solenoid valves. If the filter starts to plug, the filter inlet pressure will increase. If pressure increases to the preset pressure switch set point, then the switch contact opens and power is interrupted to the pump and to the solenoid valves. This shuts the pump down and places the valves in the backwash position. When this happens, the pressure switch set point is satisfied so as to close its contacts, but the delay relay prevents power from engaging the pump and the solenoid valves for a predetermined amount of time, during which time the partially plugged filter is backwashed. Shortly thereafter, the delay relay allows power to proceed to the pump and the solenoid-controlled valves so that the system operation returns to normal. This monitoring system is only needed in situations where the pretreatment effluent quality is poor.

In another alternative embodiment of the present invention, a chlorinator/dechlorinator is provided. Just before the treated and filtered effluent leaves the system, a slipstream of the effluent is routed to the dechlorinator through a metering valve where it dissolves dechlorination tablets. The chlorinator is also connected to a slipstream of the treated water so as to pass chlorinated water to the pump tank. This serves to chlorinate the entire system. The solution then proceeds, via gravity flow, where it joins with the chlorinated effluent and reduces or removes free and combined chlorine from the effluent. The treated filtered chlorinated and dechlorinated effluent proceeds via gravity flow to a direct discharge point.

In the system of the present invention, a backflush pipe extends in valved communication from the inlet. This backflush pipe serves to pass the backflushed accumulated water to a pretreatment tank.

DETAILED DESCRIPTION OF THE INVENTION

Figure 1:
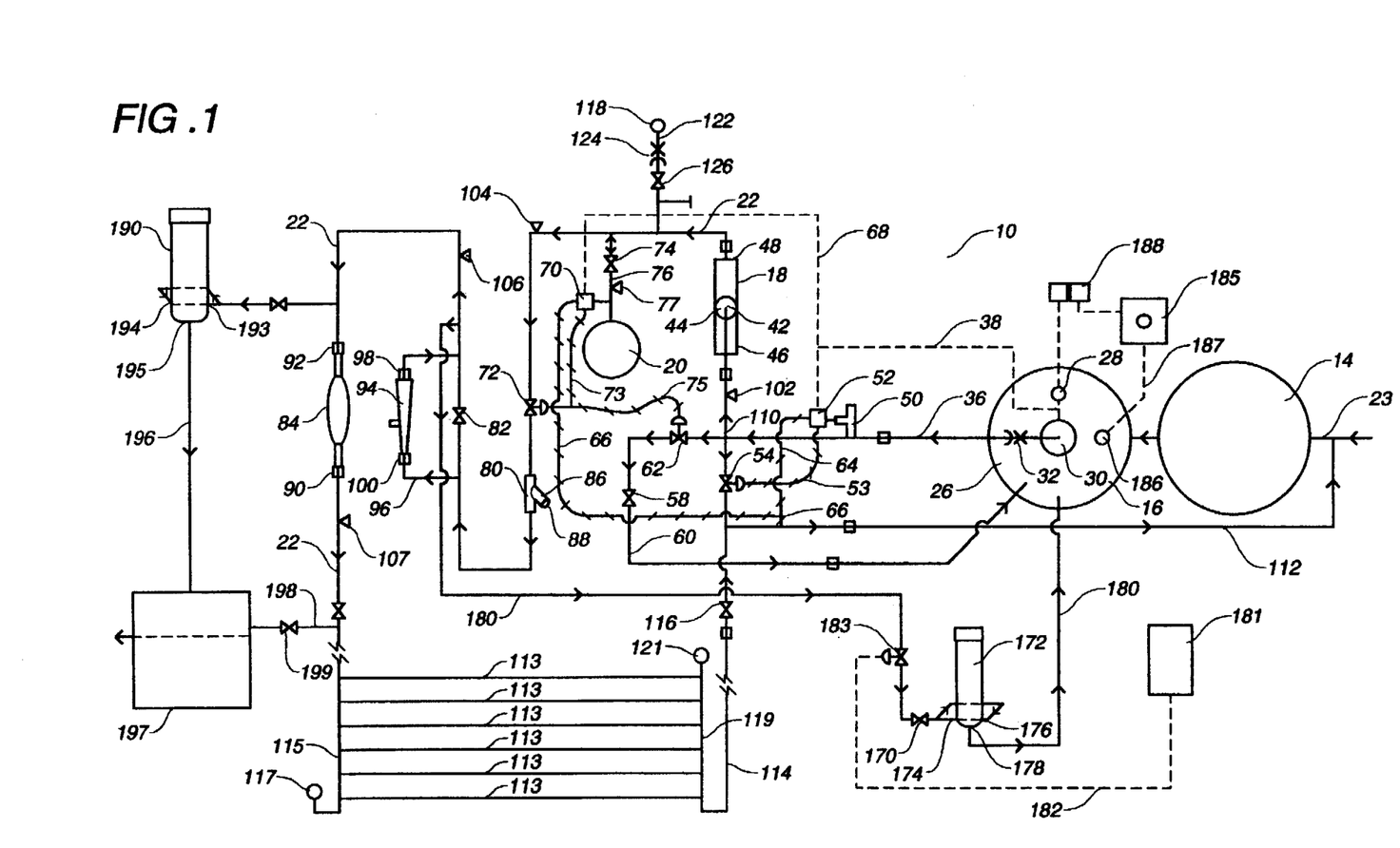
FIG. 1 is a schematic representation of the system for controlling effluent discharge in accordance with the preferred embodiment of the present invention. The alternative embodiments and optional features of the present invention are also illustrated in FIG. 1.

Referring to FIG. 1, there is shown at 10 the system for controlling effluent discharge in accordance with the preferred embodiment of the present invention. This system 10 also includes the optional and/or alternative embodiments of the commode connection arrangement 12, the optional filter backwash monitoring system, the optional chlorinator system, and the optional dechlorinator system. The effluent discharge management system of the present invention includes a wastewater inlet 14, a pump system 16, a filter 18, a filtered water retaining chamber 20, a control means, and an outlet 22.

The wastewater inlet 14 is essentially a pretreatment tank. The pretreatment tank 14 can be a home wastewater treatment system. Specifically, the pretreatment tank 14 can be a wastewater treatment system, such as the HYDRO-FLO (TM) system described herein previously. The pretreatment tank 14 is to receive household (or commercial) wastewater through line 23. As the wastewater enters the pretreatment tank 14 through line 23, it is subject to an aeration process in which it is mixed with activated sludge. This aeration process serves to cause aerobic bacteria to break down the wastewater so as to convert it into an odorless liquid and gas. Essentially, the pretreatment tank 14 is the first step in the process of cleaning the wastewater for use in drip irrigation. After the pretreatment tank 14 has effectively received the wastewater through line 23, the pretreatment tank will accumulate the wastewater as it is being purified. Eventually, the wastewater from the pretreatment tank 14 will pass through line 24 into a wastewater tank 26.

As can be seen in FIG. 1, the wastewater tank 26 is part of the "pump means" of the present invention. The wastewater tank 26 includes a float switch 28, a pump 30, and a valve 32. The wastewater tank 26 is shown as having a level of pretreated wastewater 34 therewithin. As the pretreated wastewater passes from the pretreatment tank 14 into the wastewater tank 26, the level of the wastewater 34 will actuate the float switch 28. When the wastewater 34 is at a low level, then the float switch 28 will also will be at a low level. As the wastewater lever 34 rises in the tank 26, the float switch 28 will also pivot and rise. When the float switch 28 has risen to a desired level, then the pump 30 will be activated so as to pass the pretreated wastewater 34 through the one way valve 32 and outwardly through conduit 36. It can be seen that the float switch 36 has electrical line 38 (shown in broken line fashion) connected thereto. As such, the activation of the pump 30 by the action of the float switch 28 will serve also to activate valves within the system 10 of the present invention.

As the pretreated wastewater is passed through the conduit 36, it follows a path until it is introduced into the inlet 42 of the filter 18. The filter 18 is a sand filter (to be described hereinafter in connection with FIGS. 2–4). The sand filter 18 includes a first body portion 44, a second body portion 46, and an outlet 48. A filter screen is disposed within the filter 18 within the second body portion 46 between the first body portion 44 and the outlet 48. A particulate filter material fills a portion of the interior of the filter 18. This particulate filter material should have a quality so as to filter all material having size greater than 100 microns.

After the pretreated wastewater has passed through the conduit 36, and through the filter 18, it is passed outwardly at the filter 18 through the outlet 48 and into outlet conduit 22.

As the pretreated wastewater is passed through conduit 36, a portion of the wastewater will flow into a T-filter 50. The T-filter 50 is a screen filter that is suitable for filtering particles having a size of greater than 100 microns. The T-filter 50 is connected to a fluid actuated solenoid 52. As such, the arrangement of the T-filter 50 and the solenoid 52 serves as a controller 20 for the present invention, in conjunction with the arrangement of the pump system 16. The fluid-activated solenoid 52 serves to control a valve 54. A pressure line 53 extends between the solenoid 52 and the valve 54. When the float switch 28 is in its upper position, and the pump 30 is passing the pretreated effluent through the conduit 36, then the solenoid 52 will close the valve 54 (which is normally open). The electrical line 38 serves to control the solenoid 52 when the float switch 28 is in its uppermost position. A throttle valve 58 is provided along conduit 60. Conduit 60 is interconnected with the conduit 36. As the pretreated wastewater is being pumped through the conduit 36, a portion of the pretreated wastewater will flow into the filter 18 and another portion of the effluent will recirculate through the conduit 60 back into the wastewater tank 26. The amount of the pretreated wastewater which is circulated through the conduit 60 is controlled by the proper manipulation of the throttle valve 58. A control valve 62 is also provided on line 60. Control valve 62 will be opened whenever the valve 54 is closed and whenever the pump 30 is activated so as to pass the pretreated wastewater into the filter 18. By recycling the pretreated wastewater through the line 60, overloads of the pump 30 are effectively prevented. In the event of a failure of the filter 18, the effluent is simply recycled through conduit 60 back into the wastewater tank 16. The solenoid 52 is connected to a small line 64 which serves to vent the liquids from the solenoid 52 whenever the valve 54 is in its closed position. The vented liquids pass from the end of line 66 to the pretreatment line 112.

Importantly, the electrical line 38 extends along pathway 68 to a solenoid 70. A throttle valve 74 is provided along conduit 76 to the filtered water retaining chamber 20. The filtered water retaining chamber 20 is a captive air tank which is in valved communication with the filter 18 and with the outlet conduit 22. In normal operation, the captive air tank 20 has an interior bladder which is suitable for receiving a portion of the filtered wastewater therein. As the filtered effluent passes from the outlet 48 through the outlet conduit 22, the filtered effluent will pass, under pressure, through the throttle valve 74 into the captive air tank 20. Depending upon the pressure requirements of the system, the filtered effluent will fill the captive air tank 20 to a desired pressure (approximately 40 p.s.i.). When the captive air tank 20 is suitably filled, then the pressure balance in the system will cause the filtered effluent to continue to pass through the outlet conduit 22, through the open valve 72, and out of the system. A Schrader valve 77 is provided on conduit 76 so as to facilitate pressure monitoring.

The outlet conduit 22 has the a normally closed solenoid-activated hydraulic valve 72 placed thereon. The valve 72 is controlled simultaneously with valve 62 by the action of the solenoid 70. A pressure line 73 extends from solenoid 70 to the valve 72. Similarly, a pressure line 75 extends from solenoid 70 to control valve 62. Since the valves 62 and 72 are hydraulic valves, the hydraulic pressure in the lines 73 and 75 closes the valves 62 and 72. When the hydraulic pressure is vented off, the valves 62 and 72 open simultaneously. When the pump 30 in the wastewater tank 26 is activated, then the normally closed valve 72 will open so as to allow the filtered effluent to pass through the system. When the pump 30 is turned off, the valve 72 will close (in conjunction with valve 62) so as to prevent the discharge from the captive air tank 20 from leaving the system.

When the valve 72 is in its open position, then the filtered effluent will pass along the outlet conduit 22 through a sand filter 80, through a pressure regulator 82, and through a flow meter 84. The sand trap 80 is essentially a screen filter system which is designed so as to cause any sand in the filtered effluent to fall into the chamber 86. A door 88 is provided on the end of the chamber 86 so as to allow for easy removal of any accumulated sand. The sand trap 80 allows the sand-filtered effluent to pass outwardly therefrom into the pressure regulator 82. In the preferred embodiment of the present invention, the pressure regulator 82 allows fluid pressures of over 40 p.s.i. to pass therethrough. The pressure regulator 82 essentially restricts the flow of the filtered effluent therethrough so as to allow the filtered effluent to accumulate in the captive air tank prior to passing from the system.

The flow meter 84 is removably affixed along the outlet conduit 22. Specifically, the flow meter 84 is attached by spools 90 and 92 to the outlet conduit 22. The flow meter 84 is designed so as to measure the flow of liquids therethrough. Since flow meters can be relatively expensive items, it is determined that the most cost-effective arrangement for the present invention is to make the flow meter 84 detachably connected along the conduit 22. In normal operation, the conduit 22 will simply extend outwardly to the drip field. A standard pipe section can be used by being in the area between spools 90 and 92. However, if it is necessary for diagnosis and analysis of the operation of the effluent management system 10 of the present invention, then the pipe between the spools 90 and 92 is removed and the flow meter 84 inserted thereon. After measurements are taken, then the flow meter 84 can be properly removed.

Similarly, an injector venturi valve 94 is removably attached along conduit 96 between spools 98 and 100. In normal operation, the injector venturi 94 will be replaced by a pipe extending between the spools 98 and 100. However, if it is necessary to field flush the drip irrigation system, then the injector venturi 94 can be inserted onto conduit 96. This allows chemicals to be injected into the flow of the filtered wastewater. Any chemicals that are injected into the system will pass into the drip irrigation field.

During the diagnosis, maintenance, and analysis of the effluent management system 10 of the present invention, it is often necessary to take pressure readings throughout the various components of the system. As such, Schrader valves 77, 102, 104, 106, and 107 are provided with the system. The Schrader valves 77, 102, 104, 106, and 107 resemble the valves on bicycle tires. This allows for the easy connection and disconnection of pressure measuring tools to the system. As such, if it is necessary to diagnose a particular problem in the present system, then these valves can be easily attached to the Schrader valves for the purposes of measurement. The use of the Schrader valves greatly enhances the ability to diagnose any problems that could occur within the system of the present invention. It should be noted that additional Schrader valves can be incorporated, as needed, into the flow lines of the present invention.

After the pump 30 in the wastewater treatment tank 26 has effectively pumped the pretreated wastewater from the tank 26, then the float switch 28 will be at a lower position. The lowering of the float switch 28 will send a signal to the solenoids 52 and 70 to open the valve 54, to close the valve 72, and to close the valve 62. Additionally, the pump 30 will be turned off so as to no longer pump any liquids from the interior of the wastewater tank 26. At this point in time, the captive air tank 20 will be, at least, partially filled with the filtered wastewater. When the valves are effectively closed, the pressure on the interior of the captive air tank 20 will forcibly cause the liquid therein to pass outwardly through the conduit 76 and into the conduit 22. This liquid will be blocked from passage to the drip field by the closed valve 72. The liquid from the captive air tank 20 will flow into the outlet 48 of the filter 18. This will cause the filter 18 to be effectively "backflushed". The backflushing operation will cause the accumulated filtered material to be dislodged from the fluidized sand within the filter 18. The backflushing will cause these particles to pass outwardly from the filter 18 through the inlet 42 and into the line 110. Since the valve 62 is closed and since the valve 54 is opened, the backflushed particles from the filter 18 will be flushed into the conduit 112. This material will pass through the conduit 112 and back into the pretreatment tank 14. As such, this filtered material can then be recirculated in the pretreatment tank for treatment in the standard aerobic manner.

After the filtered wastewater has passed from the outlet conduit 22, it can be delivered to the drip irrigation field 111. The drip irrigation field 111 is made up of a plurality of drip lines 113 which extend across an area of land. Each of the drip lines 113 has a plurality of apertures, holes, or slits formed therein so as to allow droplets of the filtered wastewater to pass therefrom. Typically, the drip tubing 113 is made of polyethylene and has a one-half inch diameter on two foot centers. Each of the drip tubing lines 113 is connected to a header line 115 at one end. A vacuum breaker 117 is provided on the end of the header line 115 so as to remove any vacuum occurring within the drip field system. At the other end of the drip tubing lines 113 is another header line 119. This header line can be removably affixed to the ends of the drip tubing lines 113 opposite the first header line 115. Another vacuum breaker 121 is provided on the second header line 119.

In certain circumstances, it is necessary to field flush the drip field 111. When this is necessary, the valve 52 will be in its closed position since the pump 30 is pumping the pretreated effluent into the filter 18 and outwardly through the outlet conduit 22. As a result, the valve 54 will also be closed so as to prevent any of the materials from the field flushing operation to pass into the wastewater tank 26 or into the filter 18. During the field flushing operation, the venturi injector 94 serves to receive chemicals for the scouring and flushing of the field. These chemicals will enter the filtered wastewater conduit 22 and will pass outwardly through the first header line 115, through the drip lines 113, and into the second header line 119. The chemicals which are used for the field flushing of the lines 113 should remove any flow restrictions in the drip lines 113. The field flushed materials will pass through line 114, through the open valve 116, and into the pretreatment line 112. This flushed material will then pass back into the pretreatment tank 14.

Under certain circumstances, it is desirable to manually backflush the filter 18. This is accomplished by the use of the hose connection 118 which is connected to the outlet 48 of the filter 18. The hose connection 118 is connected to line 122. Line 122 has a check valve 124 and a metering valve 126 thereon. The valves can then be opened so as to allow a flow of water from the hose connection 118 through the line 122 and into the outlet 48 of the filter 18. Since the manual backflushing operation will occur when the pump 30 is in its inactive state, the valve 72 will be normally closed, along with valve 62. Valve 54 will be open so as to allow the manually backflushed material to pass to the pretreatment tank 14.

In an alternative and optional embodiment, the system 10 of the present invention can use an optional chlorinator arrangement so as to provide for the disinfection of the effluent and the equipment. In this optional embodiment of the present invention, effluent under pressure passes through a hydraulic valve and a metering valve 170 from the outlet conduit 22. The effluent, under pressure, will then enter the chlorinator 173. The chlorinator 172 has a chamber which receives a plurality of stacked chlorine tablets. The chlorinator 172 has a first inlet 174 and a second inlet 176. These inlets 174 and 176 receive separate flows of the effluent liquid. These inlet flows of the effluent interact with the chlorine tablets so as to easily and consistently dissolve the chlorine tablets, as the system would require. The dissolved chlorine will pass with the effluent liquid through the outlet 178 and into conduit 180. The chlorine solution will leave the chlorinator 172 via gravity flow to the pump tank 26 where the pump 30 will serve to distribute the solution through the system. A timer 181 can be connected by line 182 to the hydraulic valve 183. The timer 181 can be configured so as to control the hydraulic valve 183 for the purpose of providing intermittent operation.

Another optional embodiment of the present invention employs a filter backwash monitoring system. In this embodiment, a pressure switch 184 is interconnected to conduit 36 from the wastewater tank 26. The pressure switch 184 is mounted in connection with the inlet side of the filter 18. Power is supplied to the pressure switch 184. Pressure switch 184 is also connected to the delay relay 56, to the float switch 28, to the pump 30, and to the solenoids 52 and 70. When the level in the wastewater tank 26 reaches a preset level, the solenoids 50 and 70 are engaged so that the system 10 of the present invention becomes operational. If the filter 18 starts to plug, then the filter inlet pressure will increase. If pressure increases to the preset pressure switch set point, the contact switch will open and power will be interrupted to the pump 30 and to the solenoids 52 and 70. This will shut the pump 30 down and place the valves in the backwash position (described previously). When this happens, the pressure switch set point is satisfied so as to close its contacts. The delay relay 56 will prevent power from engaging the pump 30 and the solenoids 52 and 70 for a predetermined amount of time. During this time, the partially plugged filter 18 is backwashed. Shortly thereafter, the delay relay 56 allows power to proceed to the pump 30 and to the solenoids 52 and 70 so that the system's operation returns to normal. The monitoring system, as used in this optional embodiment, is only required in situations where the pretreatment effluent quality is poor. Normally, the filter 18 is backwashed at the end of every pump cycle. However, with this monitoring system, backwashing can occur between pump cycles, if necessary.

A high level alarm panel 185 can also be provided with the present invention. An alarm switch 186 is provided on the interior of the wastewater tank 26. The alarm switch 186 is positioned so as to detect the rise of the wastewater in the tank 26 above a predetermined level. When the wastewater reaches this level, then the alarm switch 186 will transmit a signal through line 187 to the alarm panel 185 so as to alert the user of the system 10 that a problem has occurred within the wastewater tank 26. Under normal circumstances, this alarm will only sound in the event that the biological process is upset in the pretreatment tank and that the solids carryover is severe enough to plug the filter 18. Under such circumstances, the level in the wastewater tank 26 will rise and engage the alarm switch 186 so as to activate an audible and/or visual alarm panel 185. The owner of the system will notify the service man of the problem. During the time between filter plugging and the repair, the pump 30 will continue to be protected by the use of the recycle line 60. A power supply 188 is 188 is connected to the level switch 28, and to the pump 30 so as to provide the necessary power to the system 10. A separate power supply circuit provides power to the alarm panel 185 and to the alarm switch 186.

Still another embodiment of the present invention utilizes the optional dechlorinator 190. The dechlorinator 190 has a configuration similar to the chlorinator 172 (described herein previously). In normal use, just before the treated filtered chlorinated effluent leaves the system, a slipstream of the effluent is routed through line 191 through a metering valve 192 to the dechlorinator 190. As the slipstream through the line 191 passes through the inlets 193 and 194, the dechlorination tablets, within the interior of the dechlorinator 190, are dissolved. This solution then proceeds through the outlet 195 through conduit 196 where it joins with the chlorinated effluent so as to reduce or remove free and combined chlorine from the effluent. A contact tank 197 may be provided so as to cause this interaction. The chlorinated effluent can pass into the contact tank 197 through line 198 and metering valve 199. The treated filtered chlorinated, and dechlorinated, effluent can proceed by gravity flow to a direct discharge point from the contact tank 197.

Figure 2:
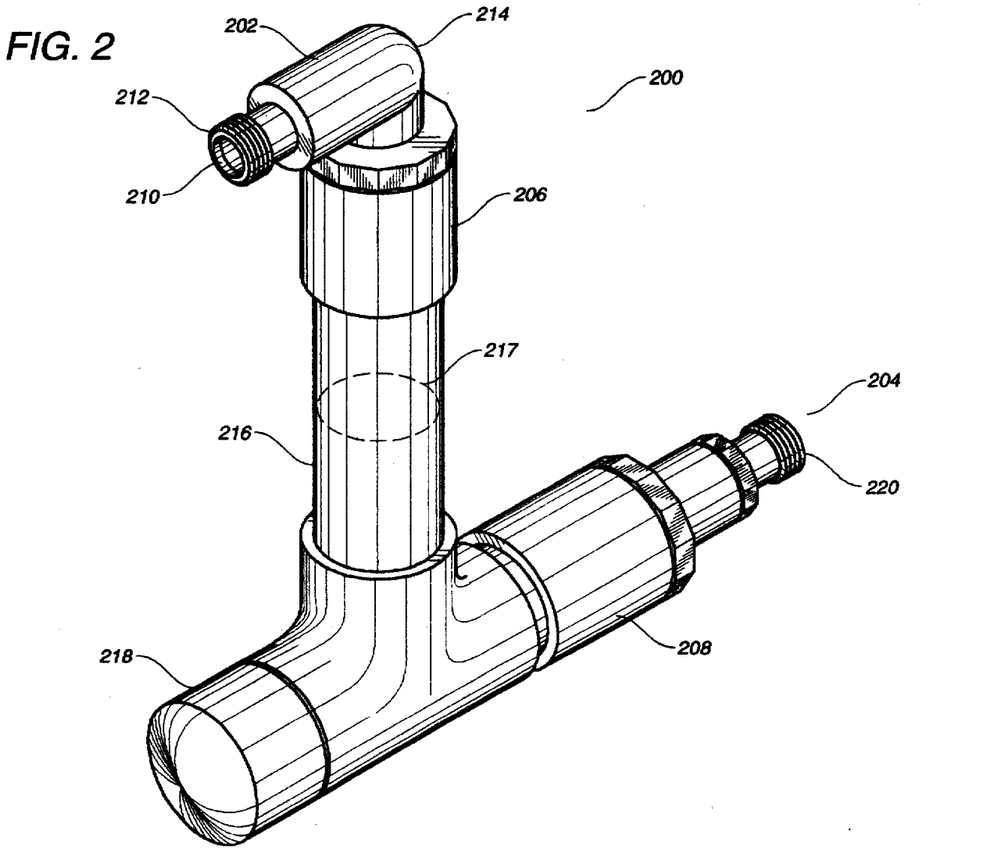
FIG. 2 is a perspective view of the sand filter of the present invention.

FIG. 2 shows the sand filter 200 as used in the present invention. The sand filter 200 is utilized as filter 18 in the system 10 (described herein previously). The sand filter 200 includes a fluid inlet 202, a fluid outlet 204, a first body portion 206 connected to the fluid inlet 202 and a second body portion 208 connected to the fluid outlet 204. A filter screen and particulate filter material is contained on the interior of the first body portion 206 and the second body portion 208.

The fluid inlet 202 includes a connector 210 which is suitable for connection to the line 110 (as illustrated in FIG. 1). The connector 210 has an external thread thereon which is suitable for receiving a pipe connected thereto. The connector 210 has an orifice 212 that allows the pretreated wastewater to be introduced therein. The pretreated wastewater will flow into the orifice 212 of the inlet 210 and into the interior of the sand filter 200. The inlet 202 includes an elbow portion 214 that allows the pretreated wastewater to flow downwardly through the first body portion 206.

The first body portion 206 is a cylindrical member that is fastened to the inlet 202. The cylindrical member 206 extends vertically upwardly from the second body portion 208. Importantly, a particulate filter material 216 extends upwardly for less than the height (or length) of the first body portion 206. The particulate filter material 216 is a sand or silica material. The silica material used as the particulate filter material 216 should have a density suitable for removing particles having a size of greater than 100 microns from the pretreated wastewater. After the pretreated wastewater passes into the orifice 212 of the connector 210, it will flow through the elbow 214 and downwardly so as to flow (or drip) onto the top surface 217 of the particulate filter material 216. It will then slowly flow through the grains of the silica material 216 and into the second body portion 208.

The first body portion 206 is in fluid communication with and extends transversely to the second body portion 208. The second body portion extends horizontally relative to the first body portion 206. The fluid outlet 204 is positioned at an end of the second body portion 208. As can be seen, the second body portion 208 has an end cap 218 affixed at an end opposite the fluid outlet 204. The interior of the second body portion 208 can be filled, at least partially, with the particulate filter material 216 (as will be described hereinafter). Eventually, the filtered wastewater will pass outwardly of the filter 200 through the outlet 204. The outlet 204 includes a threaded connector 220 that allows for connection to the outlet conduit 22 of the system 10 (as shown in FIG. 1).

During the backflushing operation, the filtered wastewater will pass into the outlet 204, through the interior of the second body portion 208, and will "bubble up" through the fluidized particulate material 216. This "bubbling up" effect serves to backflush the accumulated filtered material from the particulate material 216. The backflushed material will then flow outwardly through the inlet 202.

Figure 3:
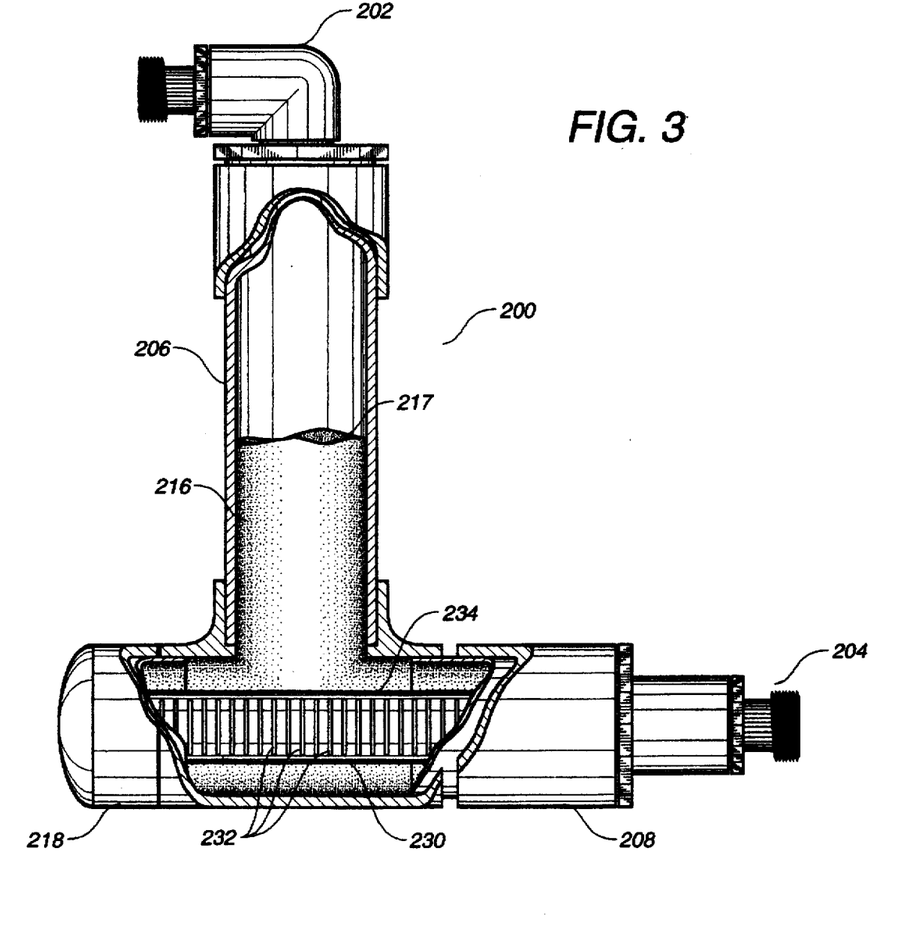
FIG. 3 is a cross-sectional view of the sand filter of the present invention.

FIG. 3 shows a cross-sectional view of the sand filter 200 in accordance with the present invention. It can be seen that the sand filter 200 includes the inlet 202, the first body portion 206, the second body portion 208 and the outlet 204. In FIG. 3, it can be seen that the particulate material 216 extends upwardly to a top level 218. The particulate material 216 extends continuously between the interior of the first body portion 206 and the interior of the second body portion 208. A filter screen 230 is disposed in the second body portion 208 between the first body portion 206 and the fluid outlet 204. As can be seen, this filter screen has a plurality of openings 232 formed therein. The particulate material 216 will extend around the exterior of the filter screen 230 so as to generally fill the interior of the second body portion 208. The filter screen 230 is in fluid communication with the fluid outlet 204. The filter screen 230 comprises a tubular member 234 extending from the fluid outlet 204 and through the interior of the second body portion 208. The openings 232 are slits which are formed in this tubular member. These slits 232 extend transversely to the longitudinal axis of the tubular member 234. Each of the slits 232 has a width less than the diameter of the particles of the particulate matter 216. It can be seen that the tubular member 234 has a length less than the length of the second body portion 208. The particulate filter material 216 fills the volume of the second body portion 208 exterior of the tubular member 232.

In normal use, the pretreated wastewater will flow into the inlet 202 and flow downwardly through the particulate filter material 216. Eventually, the pretreated wastewater will be filtered by passing through this silica material 216. The filtered wastewater will then flow into the slits 232 formed on the tubular member 234 of the filter screen 230. It will then pass outwardly from the tubular member 234 through the outlet 204 of the second body portion 208. However, in the instance of backflushing, the filtered wastewater which is accumulated in the captive air tank 20 will flow into the outlet 204, through the slits 232 and upwardly through the sand 216 on the interior of the second body portion 208 and the first body portion 206. Since the sand 216 has a greater density than that of the water, the sand will be fluidized, but will remain within the confines of the first tubular member 206. The backflushed liquid will then pass outwardly through the inlet 202 of the sand filter 200.

Figure 4:
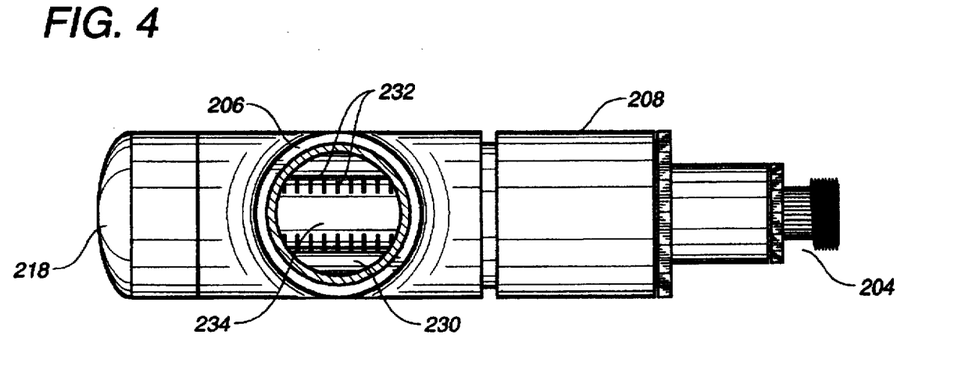
FIG. 4 is a cross-sectional plan view of the sand filter of the present invention.

FIG. 4 shows a top view of the first body portion 206 as positioned on the second body portion 208. It can be seen that the filter screen 230 extends longitudinally within the second body portion 208. The slits 232 are formed on the tubular member 234 and extend outwardly therefrom generally transverse to the longitudinal axis of the tubular member 234. The particulate material 216 will surround the tubular member 234 within the second body portion 208. It can be seen that both the first body portion 206 and the second body portion 208 have a generally cylindrical configuration. The first body portion 206 is positioned generally between the outlet 204 and the end cap 218 of the second body portion 208.

Figure 5:
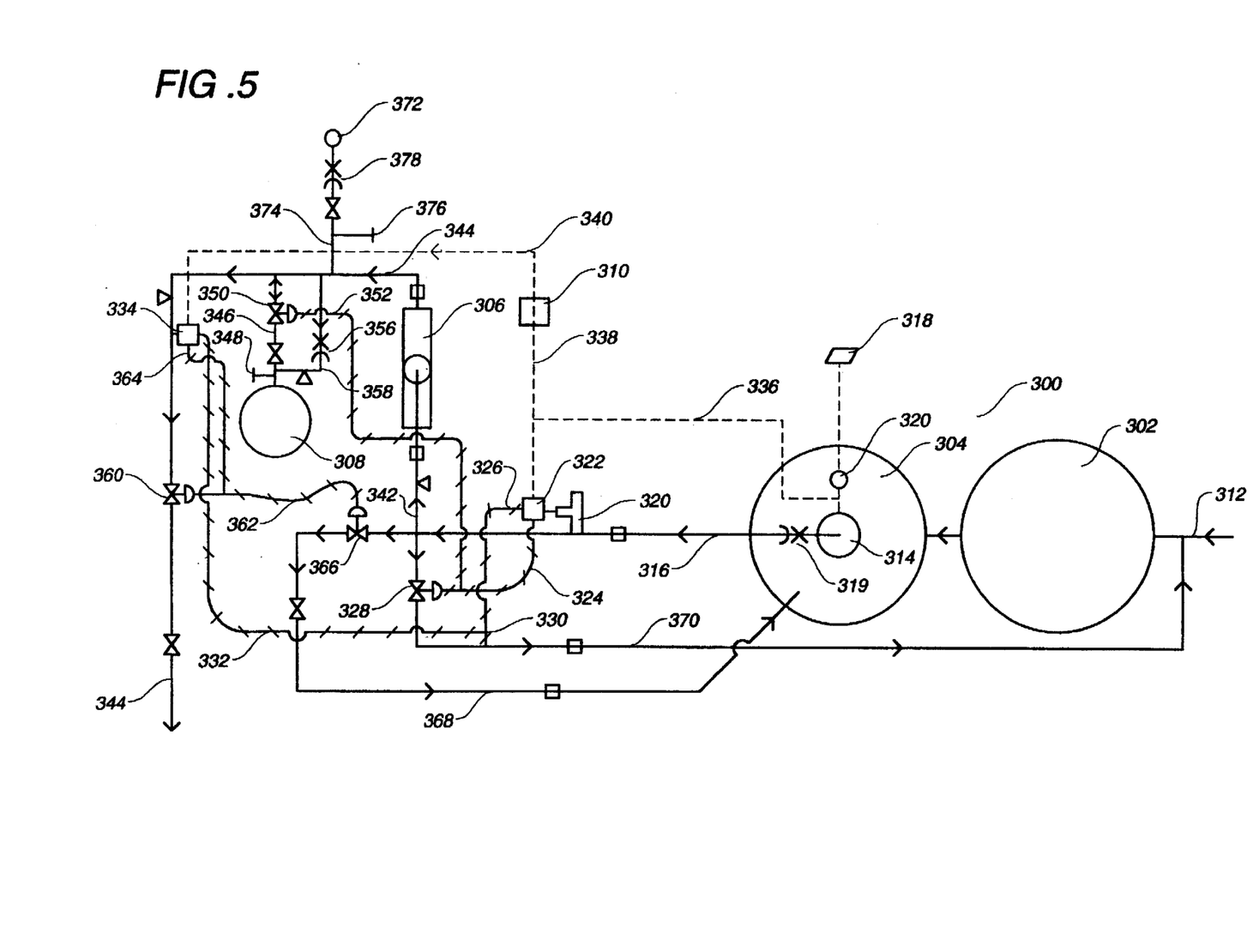
FIG. 5 is a schematic representation of an alternative embodiment of the system of the present invention having a severe duty backwash capability and an optional delay relay.

FIG. 5 is a schematical representation of an alternative embodiment of the wastewater effluent management system of the present invention. The effluent management system 300 of FIG. 5 includes a severe duty backwash package having an optional delay relay. The package 300 includes the pretreatment tank 302, the pump tank 304, the filter 306, the backwash tank 308 and the optional delay relay 310. Inlet 312 passes the wastewater effluent into the pretreatment tank 302. The pump 314 of the pump tank 304 passes the treated effluent along conduit 316. A power supply 318 is electrically connected to a level switch 320 on the interior of the pump tank 304. The conduit 316 includes a check valve 319. A small filter 320 is connected to the conduit 316 and also to a solenoid 322. Pressure lines 324 and 326 extend from the solenoid 322. The pressure line 324 is connected between the solenoid 322 and a valve 328. The pressure line 326 is connected to a vent line 330 and is also interconnected to another pressure line 332 leading to another solenoid 334. Control lines 336, 338, and 340 extend from the optional delay relay 310. The control line 336 is interconnected between the delay relay 310 and the level switch 320 of the pump tank 304. The control line 338 is connected between the delay relay 310 and the solenoid 322. The control line 340 is interconnected between the delay relay 310 and the solenoid 334.

Conduit 316 extends along line 342 to the filter 306. The filter 306 has the configuration described herein previously. The outlet 344 of the filter 306 extends to the drip irrigation field, or for other applications. Solenoid 334 is interconnected to the outlet line 340. The backwash tank 308 is connected along line 346 to the outlet line 344. Line 346 includes a connector 348 as an optional connection for the solenoid 334. A control valve 350 is positioned along line 346. Control valve 350 is interconnected to the pressure line 352. Pressure line 352 extends to and is interactive with the pressure line 324. A check valve 356 is provided along line 358 leading to the backwash tank 308.

Another control valve 360 is positioned on the outlet line 344. Control valve 360 is connected to a pressure line 362. The pressure line 362 is interconnected with the solenoid 334 along pressure line 364. The pressure line 362 is also connected to another control valve 366. The control line 366 is positioned on the conduit 316 leading from the pump tank 304. The control valve 366 is positioned so as to effect the proper recycling of the effluent from the pump tank 304. As such, the control valve 366 controls the passage of the effluent through the recycle line 368. The control valve 328 is positioned on the backwash line 370 leading from the conduit 316 to the inlet 312 of the pretreatment tank 302. The vent lines 330 are connected to the backwash line 370.

A hose connector 372 is provided along hose connection line 374 to the outlet 344. A commode recycle connection 376 is positioned along the line 374. A check valve 378 is provided along the hose connection line 374.

In normal use, when the level switch 320 energizes the solenoid 322 and the delay relay 310, then the hydraulic valves 328 and 350 will be closed. The hydraulic valves 360 and 366 remain closed because the delay relay 310 momentarily interrupts power to the solenoid 334. With all of the hydraulic valves closed, the filtered water proceeds through the backwash control valve 356 and charges the backwash tank 308. At a preset time, the delay relay 310 closes its contacts and energizes the solenoid 334. This opens the hydraulic valves 360 and 366. The filtered water will then exit the management system 300 through the outlet line 344. If the filter 306 would start to plug, the filter downstream pressure will decrease, but the water pressure in the backwash tank 308 will remain constant because the valve 350 and the check valve 356 are closed. When the level switch 320 deenergizes solenoids 322 and 334, the valves 360 and 366 close and valve 328 and 350 are open. As a result, the maintained pressurized water exits the backwash tank 308 and thoroughly cleans the filter 306. Without the optional delay relay 310, the valves 360 and 366 do not stay momentarily closed. The filter downstream pressure will be relatively high until the filter 306 starts plugging. If the filter downstream pressure starts to drop, then the pressure in the backwash tank 308 will remain constant.

Figure 6:
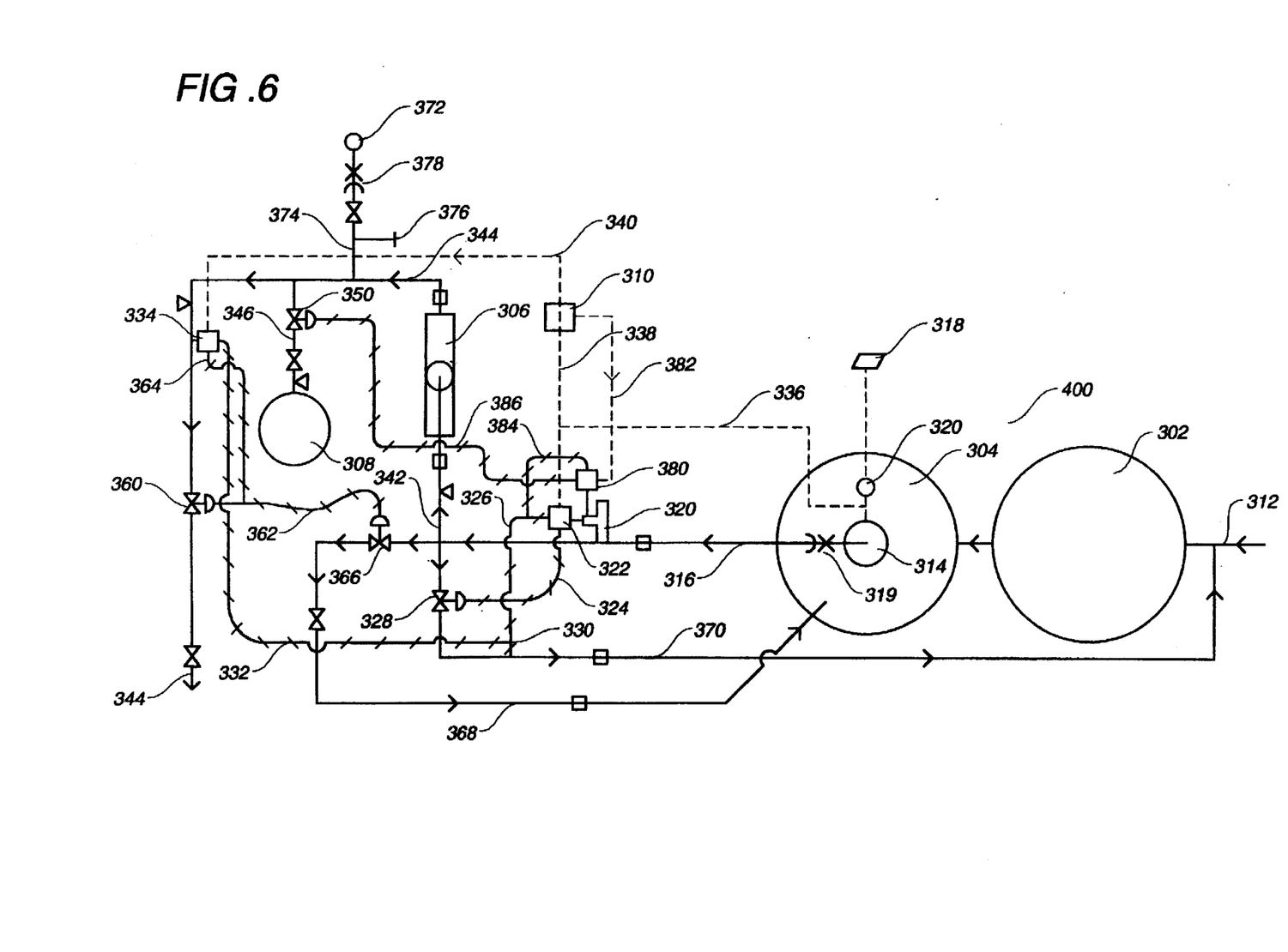
FIG. 6 is a schematic representation of another alternative embodiment of the present invention having a severe duty backwash package and a delay relay.

FIG. 6 shows a schematic representation of an alternative embodiment of the management system of the present invention. The alternative embodiment shows the management system 400 with the severe duty backwash arrangement. In the system 400, the delay relay 310 is not an optional feature. In general, the system 400 has a configuration similar to that shown in FIG. 5. However, the interconnections between the delay relay 310 to the valves and solenoids is somewhat different. Additionally, the line 358 and the check valve 356 are not connected to the backwash line 346.

The system 400 includes a third solenoid 380 which is connected to a control line 382 leading to the delay relay 310. The solenoid 380 has a pressure line 384 leading to the pressure line 326 extending from the solenoid 322. The solenoid 380 also has a pressure line 386 extending to the control valve 350 on the backwash line 346 from the backwash tank 308. Solenoid 380 is interconnected to the small filter 320.

In the system 400, when the level switch 320 energizes the solenoid 322 and the delay relay 310, then the solenoid 322 will close the valve 328. The delay relay 310 momentarily interrupts power to the solenoids 338 and 380. This keeps the valves 360 and 366 closed and the valve 350 is opened. The filtered water proceeds through the valve 350 and into the backwash line 346 so as to charge the backwash tank 308. At the present time, the delay relay 310 closes its contacts and energizes the solenoids 334 and 380. Solenoid 334 then opens the valves 360 and 366. The solenoid 380 will close the valve 350. The filtered water will then proceed through the system 400. If the filter 306 starts to plug, then the filter downstream pressure will decrease but the water pressure in the backwash tank 308 will remain constant. When the level switch 320 deenergizes the solenoids 322, 334, and 380, then the valves 360 and 366 close and the valves 328 and 350 open. The pressurized water will then exit the backwash tank 308 through the backwash line 346 and pass through line 344 so as to thoroughly clean the filter 306. In the system 400, the delay relay is not an optional feature.

Figure 7:
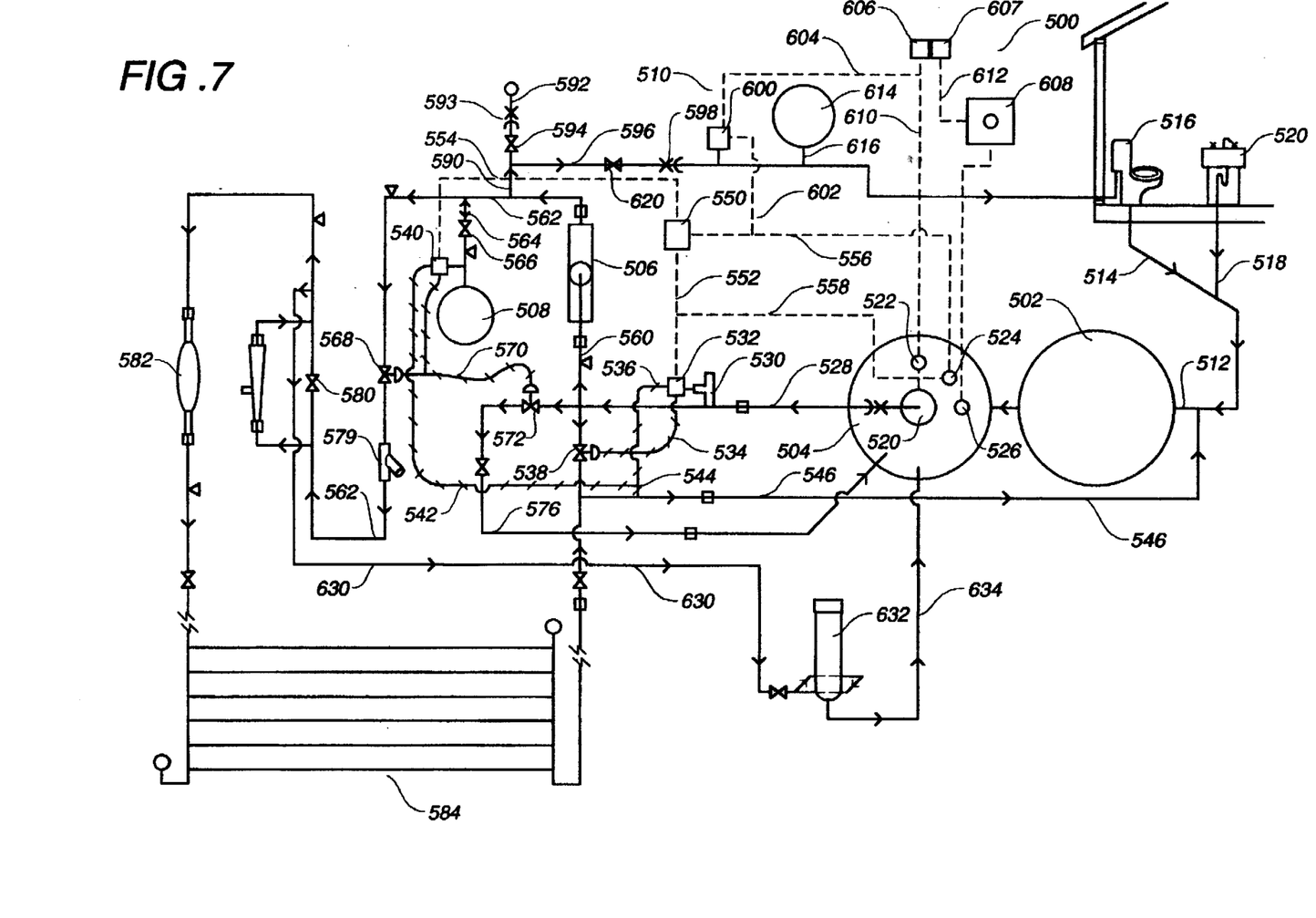
FIG. 7 is a schematic representation of another alternative embodiment of the present invention utilizing a commode recycle system.

Referring to FIG. 7, there is shown an alternative embodiment 500 of the effluent management system in accordance with the present invention. The effluent management system 500 includes the pretreatment tank 502, the pump tank 504, the filter 506, the backwash tank 508 and a commode recycling system 510. In this alternative embodiment, the pretreatment tank 502 has an inlet 512 so as to allow wastewater influent to enter the pretreatment tank 502. In the commode recycling system 510, this wastewater influent is delivered to the inlet 512 by way of a pipe 514 from the commode 516 and from a pipe 518 from the sink 520. The wastewater from the commode 516 and from the sink 520 is delivered through these pipes to the inlet 512.

The pump tank 504 has a pump 520, a level switch 522, a low level override switch 524, and an alarm switch 526. The pump 520 delivers the treated water through the conduit 528. This treated water will pass into a small filter 530 which is connected to a solenoid 532. The solenoid 532 includes pressure lines 534 and 536. The pressure line 534 is connected to a control valve 538. The pressure line 536 is connected to another solenoid 540. The pressure line 536 is joined to another pressure line 542 which connects to the solenoid 540. Each of the lines 536 and 542 is vented through line 544 to the backwash line 546. A relay 550 is connected to the solenoid 535 by a control line 552. Relay 550 can also be electrically (or otherwise) connected to the solenoid 540 along line 554. The relay 550 includes a connection to the low level override switch 524 by line 556. Line 558 connects the line 552 to another side of the low level override switch 554.

The conduit 528 is interconnected to the conduit 560 which extends to the filter 506 (described herein previously). After the treated liquid passes through the filter 506, it is discharged into the outlet line 562. A flow line 564 extends off the outlet line 562 to the backwash tank 508. A valve 566 is connected along the line 564 so as to control the flow of the treated liquid into the backwash tank 508. A control valve 568 is connected along the outlet conduit 562. The control valve 568 is connected by pressure line 570 to a control valve 572 on the conduit 528. The control valve 572 controls the flow of liquids into the backwash line 576. The outlet line 565 serves to pass the treated liquid through the sand trap 579, the pressure regulator 580, the flow meter 585, and into the drip irrigation field 584.

Importantly, the commode recycling system 510 includes a fluid flow line 590 which communicates with the outlet conduit 562. A manual backwash connection 592 is provided so as to allow for the manual backflush of the system. A check valve 593 and a throttling ball valve 594 are provided on this backwash connection 592. Conduit 596 extends from the fluid flow line 590 through the check valve 598. A pressure switch 600 is connected to the conduit 596 so as to monitor the pressure of fluids within the conduit 596. The pressure switch 600 is electrically connected to the line 556 along line 602 and is also electrically connected to a power source 606 along line 604. The power source 606 supplies power to the pressure switch 600. The power source 606 is electrically connected to the level switch 522 and to the pump 520. Another source of power 607 is connected to a high level alarm panel 608. Line 610 connects the source of power 606 to the pump 520. Line 612 connects the source of power 607 to the alarm panel 608 and to the alarm switch 526. A captive air tank 614 is connected by pipe 616 to the fluid flow line 596. The captive air tank 614 functions in a manner similar to the backwash tank 508. In essence, the captive air tank 614 will accumulate liquids therein and discharge the liquids through line 596 to the commode 516.

In normal use, a slip stream of filtered chlorinated wastewater effluent is piped through the ball valve 620 and through the check valve 598 into the air tank 614 and then onto the commode 516. The effluent is stored in the captive air tank 614 under pressure. The air tank 614 can be discharged into the commode 516 upon demand. The pressure switch 600 is installed on the line 596 downstream of the check valve 598. When the liquid pressure in the line 596 falls below the set point, the switch contacts close and supply electrical power to the relay 550 and to a low level override switch 524 in the pump tank 504. Power is also supplied to the pump 520 and to the solenoid 532. This serves to engage the pump 520 and the solenoid 532. The energized relay 550 prevents power from travelling to solenoid 540. As a result, all three of the hydraulic valves 538, 568 and 572 go to the inactive closed position. The filtered, disinfected effluent discharges to the air tank 614 and to the backwash tank 508 until the set point of the pressure switch 600 is achieved. The switch contacts will then open and remove power from the relay 550, the low level override switch 524, the pump 520, and to the solenoid 535. The hydraulic valve 538 opens such that the stored filtered water under pressure exits the backwash tank 508 so as to reverse the flow through the filter 506 back to the pretreatment tank 505. Pressurized effluent is then stored in the air tank 614 awaiting use by the commode 516.

As was described previously in conjunction with FIG. 1, a line 630 is provided so as to pass a slip stream of effluent to the chlorinator 632. The chlorinator 632 will provide chlorine treatment to the liquid passing therethrough. The liquid will pass from the chlorinator 632 into line 634 and back to the pump tank 504. By treating the liquid with chlorine, the present invention assures that a constant supply of chlorine is provided to the effluent throughout the system.

Figure 8:
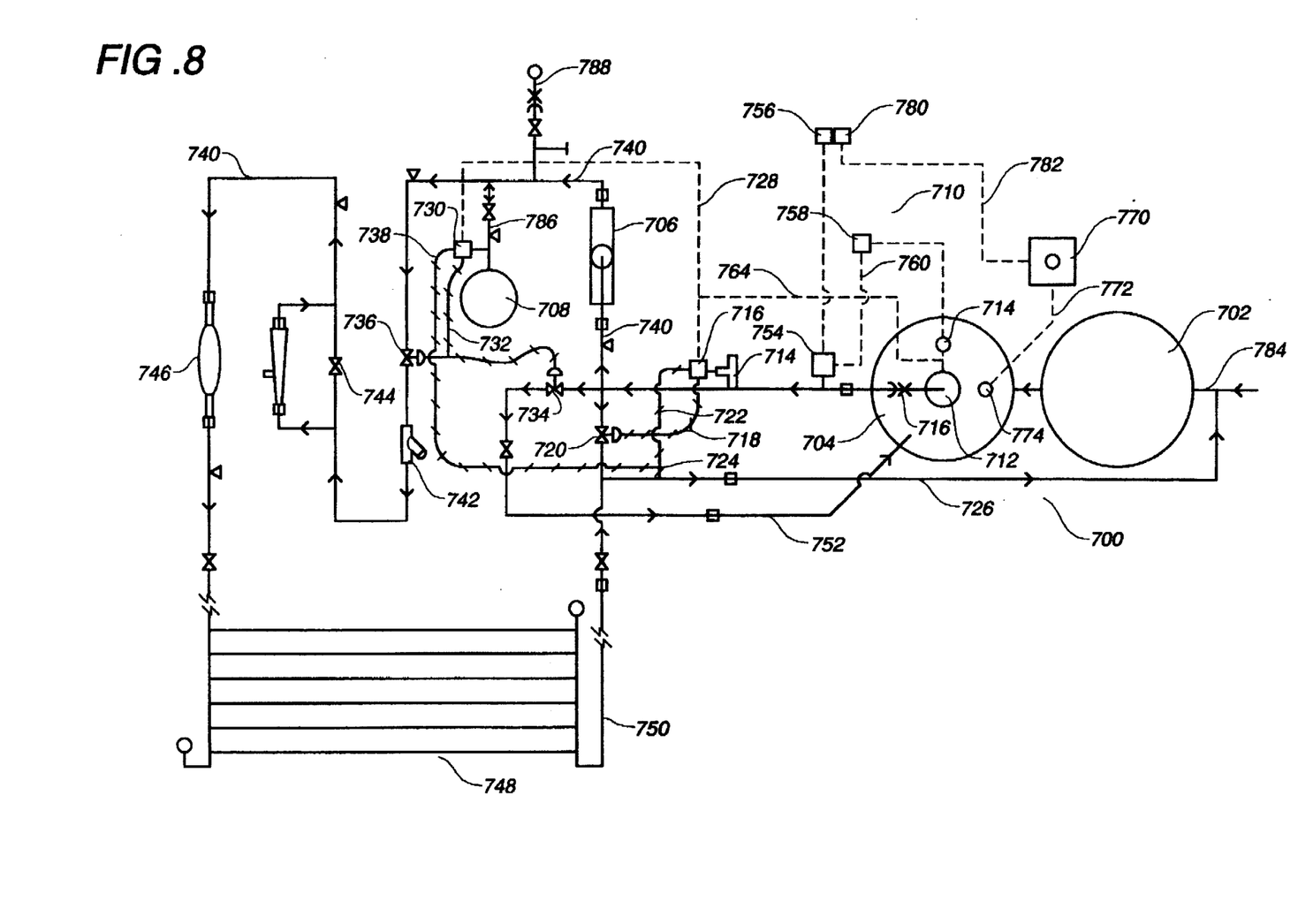
FIG. 8 is a schematic representation of a further alternative embodiment of the present invention utilizing an optional filter backwash monitoring system.

FIG. 8 shows a further alternative embodiment of the present invention. The effluent management system 700 of FIG. 8 is illustrated as using an optional filter backwash monitoring system. This system 700 includes a pretreatment tank 702, a pump tank 704, a filter 706, and a backwash tank 708. The filter backwash monitoring system is illustrated at 710 in FIG. 8.

The pump tank includes the pump 712, the level switch 714, and the check valve 716 in the manner described herein previously. Conduit 712 extends from the pump tank 704 to the small filter 714. Solenoid 716 is connected to the filter 714. A pressure line 718 extends from the solenoid 716 to a valve 720. Another pressure line 722 extends from the solenoid 716 to the vent line 724. The vent line 724 is connected to the backwash/field flush line 726.

The solenoid 716 is electrically connected along lines 728 to another solenoid 730. The solenoid 730 has a pressure line 732 that is connected, simultaneously, to a valve 734 and to a valve 736. Another pressure line 738 extends from the solenoid 730 to the vent line 724.

The conduit 712 is connected to an outlet line 740 which extends to the filter 706 and outwardly of the system. The outlet conduit 740 includes valve 736 positioned thereon. The filtered effluent passes through the valve 736, through the sand trap 742, through the pressure regulator 744, through the flow meter 746, and into the drip irrigation field 748. This arrangement is conventional to the previous embodiments of the present invention.

The conduit 712 is also connected to the backwash/field flush 726. The valve 720 is positioned on line 750 between the backwash/field flush line 726 and the conduit 712. The conduit 712 is also connected to the recycle line 752. The recycle line 752 serves to recycle a portion of the filtered effluent back to the pump tank 704.

In this embodiment of the present invention, a pressure switch 754 is positioned on the conduit 712 between the pump tank 704 and the filter 714. A power supply 756 is independently connected to the pressure switch 754. A delay relay 758 is electrically connected, at one end, to the level switch 714 and to the pump 712. The delay relay 758 is also electrically connected along line 760 to the pressure switch 754. An electrical line 764 extends from the level switch 714 to the solenoids 716 and 730. A high level alarm panel 770 is electrically connected along 772 to an alarm switch 774 within the pump tank tank 704. An independent power supply 780 is electrically connected along line 782 to the high level alarm panel.

In the present embodiment of the present invention, the pretreatment tank 702 receives a wastewater influent from line 784, in the manner described herein in the previous embodiments. Additionally, the previously described systems, such as the drip field 748, the pressure regulator 744, the flow meter 746, the backwash tank 708 (and its associated conduits 786), and the manual backwash hose connection 788 function in the manner described herein previously.

In this embodiment 700 of the system of the present invention, a filter backwash monitoring system is provided. The pressure switch 754 is mounted on the inlet side of the filter 706. Power is supplied from the power supply 756 to the pressure switch 754. The pressure switch 754 is connected along line 760 to the delay relay 758, to the float switch 714, to the pump 712, and to the solenoids 716 and 730. If the filter 706 starts to plug, then the filter inlet pressure will increase. If pressure increases to the preset pressure switch set point, then the switch contact opens and power is interrupted to the pump 712 and to solenoid valves 716 and 730. This shuts the pump 712 down and places the valves into the backwash position. In this arrangement, valves 734 and 736 will be closed and valve 720 will be opened. When this happens, the pressure switch set point is satisfied so as to close its contacts, but the delay relay 758 prevents power from engaging the pump 712 and the solenoid valve 716 and 734 for a predetermined amount of time, during which time the partially plugged filter is backwashed. Shortly thereafter, the delay relay allows power to proceed to the pump 712 and the solenoid-controlled valve 716 and 730 so that the system operation returns to normal. This monitoring system is only needed in situations where the pretreatment effluent quality is poor.

The present invention has a large number of advantages not found in prior art systems. Most importantly, the present invention allows the wastewater effluent to be used for drip irrigation, spray irrigation, and/or for direct discharge. The use of the sand filter 200 essentially guarantees that any discharge from the system 10 will have particles of less than 100 microns in diameter. The present invention allows the commode water to be properly recycled and reutilized. The backflushing system of the present invention allows for the proper cleaning of the filter without accumulation. The problems associated with the prior use of screen and disk filters are solved by the present invention. Whereas the screen and disk filters would become clogged very often, the present invention effectively cleans the filter on every backflush operation. It is believed that sand filter is five times more effective for the removal of effluent particulates than screen and disk filters used on other systems. The present invention allows drip fields to effectively solve the problem of wastewater disposal onsite. Since the wastewater is filtered, the drip lines will be free of clogging and accumulation of material. Even in the event of a clog or another problem, the present invention facilitates the ability to field flush the drip irrigation system. The present invention economically, efficiently, and effectively allows for the management of effluent from wastewater systems.

The system of the present invention not only manages the drip tubing disposal field, but can also manage the effluent for safe disposal and reuse by means of direct discharge to lakes, bays, streams, surface irrigation, conventional gravity trench disposal, and commode recycling. One of the biggest concerns that the regulators have always had in direct discharge and surface irrigation is the question of who will make sure that the systems are working properly so that the systems are not putting raw sewage into the waterways, into the air, or on the surface of the ground. The regulators approve the disposal by large municipal plants since they have operators on site daily to make sure that the necessary adjustments are made to prevent raw sewage being discharged. Since the present invention provides a fail safe system that can replace an operator, the present invention eliminates the need for the on site operator.

The foregoing disclosure and description of the invention is illustrative and explanatory thereof. Various changes in the details of the illustrated system, or the details of the illustrated configuration, may be made within the scope of the appended claims without departing from the true spirit of the invention. The present invention should only be limited by the following claims and their legal equivalents.

I claim:

1. A system for controlling effluent discharge comprising:
   an inlet for passing wastewater;
   a filter means connected to said inlet, said filter means for removing solids from the wastewater;
   a filtered water retaining means connected to an outlet of said filter means, said filtered water retaining means for accumulating a portion of the water passed from said filter means;
   a filtered water outlet means connected to said outlet of said filter means, said filtered water outlet means for passing filtered water exterior of said system; and
   control means connected to said filtered water retaining means so as to selectively pass a flow of the accumulated water into said filter means, said filtered water retaining means comprising:
   a captive air tank in valved communication with said filter means and said filtered water outlet means, said captive air tank having an interior bladder, said control means connected to said captive air tank so as to cause said accumulated water to backflush said filter means.

2. The system of claim 1, further comprising:

a pump means for passing wastewater into said inlet, said control means interconnected to said pump means, said pump means having an active state and an inactive state, said control means passing said flow during said inactive state.

3. The system of claim 2, said pump means comprising:

a wastewater tank;

a float switch means positioned within said wastewater tank; and a pump positioned within said wastewater tank, said float switch means connected to said pump so as to control said pump between said active state and said inactive state, said float switch means responsive to a level of wastewater in said tank.

4. The system of claim 2, said filtered water outlet means comprising:

a conduit extending from said outlet of said filter means;

an accumulation tank connected in valved communication with said conduit, said accumulation tank for receiving filtered water from said conduit; and a commode connector extending from said accumulation tank to a commode tank, said control means for actuating a valve so as pass filtered water from said accumulation tank into said commode tank.

5. The system of claim 4, said accumulation tank being a captive air tank, said filtered water outlet means comprising:

a pressure switch means connected to said conduit and connected to said control means, said pressure switch means for activating said pump means upon sensing pressure in said conduit below a predetermined value and for deactivating said pump means upon sensing pressure in said conduit above said predetermined value.

6. The system of claim 1, said filter means comprising:

a first body portion connected to said inlet;

a second body portion connected to said first body portion;

a filter screen disposed in said second body portion between said first body portion and said outlet, said filter screen having a plurality of openings therein; and a particulate filter means filling an area between said second body portion and said filter screen and extending into said first body portion, said particulate filter means for filtering wastewater passing therethrough.

7. The system of claim 6, said first body portion in communication with and extending transversely to said second body portion.

8. The system of claim 7, said first body portion extending vertically above said second body portion, said second body portion extending horizontally, said inlet connected to an end of said first body portion, said outlet connected to an end of said second body portion.

9. The system of claim 6, said filter screen being a tubular member extending from said outlet into said second body portion, said openings being slits formed in said tubular member, each of said slits having a width less than a diameter of a particle of said particulate filter means.

10. The system of claim 6, said particulate filter means being silica particles, said silica particles filling said second body portion exterior of said filter screen, said silica particles extending continuously into said first body portion.

11. The system of claim 1, said filtered water outlet means comprising:

a sand trap means interconnected to said outlet of said filter means, said sand trap means for removing sand from the filtered water.

12. The system of claim 1, said filtered water outlet means comprising:

a conduit extending from said outlet of said filter means; and a pressure regulator means demountably attached along said conduit, said pressure regulator means for controlling a pressure of said filtered water passing therethrough.

13. The system of claim 1, said filtered water outlet means comprising:

a conduit extending from said outlet of said filter means; and a fluid injector means demountably attached along said conduit, said fluid injector means for injecting a chemical into said filtered water as passed through said filtered water outlet means.

14. The system of claim 1, said filtered water outlet means comprising:

a conduit extending from said outlet of said filter means; and a flow meter means demountably attached along said conduit, said flow meter means for measuring a flow rate of said filtered water through said conduit.

15. The system of claim 1, said filtered water outlet means comprising:

a plurality of drip tubing lines, said drip tubing lines for passing said filtered water exterior of the system.

16. The system of claim 15, said plurality of drip tubing lines having an end connected to a flush line, said flush line extending to a treatment tank.

17. The system of claim 1, further comprising:

a backflush pipe means extending in valved communication from said inlet, said backflush pipe means for passing the backflushed accumulated water to a pretreatment tank.

* * * * *